US012736068B2

(12) United States Patent
Johnson et al.

(10) Patent No.: US 12,736,068 B2
(45) Date of Patent: Sep. 15, 2026

(54) TRANSFER VALVE WITH DUAL AUTHORITY CONTROL PORTING

(71) Applicant: Hamilton Sundstrand Corporation, Charlotte, NC (US)

(72) Inventors: Wayne Johnson, West Hartford, CT (US); Michael Ferrarotti, Durham, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/934,737

(22) Filed: Nov. 1, 2024

(65) Prior Publication Data

US 2026/0126060 A1 May 7, 2026

(51) Int. Cl.
*F15B 13/04* (2006.01)

(52) U.S. Cl.
CPC ................................ *F15B 13/0401* (2013.01)

(58) Field of Classification Search
CPC ............ F15B 2013/041; F15B 13/0401; F15B 13/0402
See application file for complete search history.

(56) References Cited

U.S. PATENT DOCUMENTS 6,637,199 B2 10/2003 Spickard
7,587,900 B2 9/2009 Shelby et al.
11,300,222 B1 * 4/2022 Higgins .............. F16K 11/0712
11,746,710 B2 9/2023 O'Rorke et al.
12,000,346 B2 6/2024 Baker et al.
2019/0024806 A1 * 1/2019 Cis ...................... F16K 11/0708
2024/0175399 A1 5/2024 Hahn

FOREIGN PATENT DOCUMENTS

CN 108591159 A * 9/2018 .......... F15B 13/0402

* cited by examiner

*Primary Examiner* — Abiy Teka
(74) *Attorney, Agent, or Firm* — Kinney & Lange, P.A.

(57) ABSTRACT

Apparatus and associated methods relate to a transfer valve with dual authority control porting. The transfer valve has a hydraulic cylinder having a cylindrical wall extending between first and second ends. The cylindrical wall has hydraulic ports therethrough for facilitating operation of the transfer valve. Within the hydraulic cylinder, a bilaterally moveable spool is axially moveable between first and second positions. The bilaterally moveable spool defines hydraulic chambers within the hydraulic cylinder. In the first position, the hydraulic chambers and the hydraulic ports form a fluidly conductive path between a first source and a first application, and another between a second source and a second application. In the second position, the cavities and the hydraulic ports form a fluidly conductive path between the first source and the second application, and another between spool positioning cavities of the transfer valve and the first application.

20 Claims, 2 Drawing Sheets

TRANSFER VALVE WITH DUAL AUTHORITY CONTROL PORTING

BACKGROUND

A linear hydraulic actuator can be used to position a kinematic device, sometimes via an intermediate linking mechanism. A linear hydraulic actuator typically has a bilaterally moveable piston within a hydraulic cylinder. On either side of the bilaterally moveable piston are hydraulic chambers which are typically filled with hydraulic fluid. An unbalanced pressure (i.e., a non-zero differential pressure across the bilaterally moveable piston) applied to the hydraulic fluids in the hydraulic chambers on opposite sides of the bilaterally moveable piston generates a force that can move the bilaterally moveable piston, which can then position the kinematic device coupled thereto. The displacement of the bilaterally moveable piston is in the direction of a central axis of the hydraulic piston. Because hydraulic fluids are typically incompressible (or nearly so), a hydraulic controller of the linear hydraulic actuator can provide precise linear displacement of the bilaterally moveable piston.

Hydraulic systems are used to manipulate or operate various kinematic devices in aircraft, especially larger aircraft. Such kinematic devices, which can be hydraulically manipulated or operated, can include moveable airfoil surfaces, landing gear deployment and retraction mechanisms, turbofan engine control devices, etc. Some kinematic devices can be moved in a fail-safe position, should the kinematic device's hydraulic controller become inoperable, for whatever reason. Other kinematic devices are more important, and the operation thereof should continue in spite of any malfunction of a hydraulic controller.

SUMMARY

Some embodiments relate to a transfer valve with fail-safe positioning capability. The transfer valve includes a bilaterally moveable spool within a hydraulic cylinder. The transfer valve has a cylindrical wall extending between first and second ends. A plurality of hydraulic ports is formed through the cylindrical wall. This plurality of ports includes a pair of spool-controller ports, a pair of actuator-controller ports, and a pair of hydraulic-actuator ports. The bilaterally moveable spool is axially moveable between first and second positions within the hydraulic cylinder. The bilaterally moveable spool has a plurality of sealing lands configured to provide hydraulic seals with an interior surface of the cylindrical wall, thereby defining a plurality of hydraulic chambers within the hydraulic cylinder. This plurality of hydraulic chambers includes a pair of spool-positioning chambers at ends of the bilaterally moveable spool. Each of the pair of spool-positioning chambers is in fluid communication with a corresponding one of the pair of spool-controller ports. The plurality of hydraulic chambers is configured to provide fluid communication between each of the pair of hydraulic-actuator ports and a corresponding one of the pair of actuator-controller ports in response to the bilaterally moveable spool being moved to the first position. The plurality of hydraulic chambers is further configured to provide fluid communication between each of the pair of hydraulic-actuator ports and a corresponding one of the pair of spool-controller ports in response to the bilaterally moveable spool being moved to the second position.

Some embodiments relate to a hydraulic system including a hydraulic actuator, an actuator controller, a transfer-valve controller, and a transfer-valve. The hydraulic actuator is configured to control position of a kinematic device. The actuator controller is configured to control position of the hydraulic actuator, thereby controlling the position of the kinematic device. The transfer valve has a cylindrical wall extending between first and second ends 40 and 42. The cylindrical wall has a plurality of hydraulic ports therethrough including a pair of spool-controller ports in hydraulic communication with the transfer-valve controller, a pair of actuator-controller ports in hydraulic communication with the actuator controller, and a pair of hydraulic-actuator ports in hydraulic communication with the hydraulic actuator. The bilaterally moveable spool is axially moveable between first and second positions within the hydraulic cylinder. The bilaterally moveable spool has a plurality of sealing lands configured to provide hydraulic seals with an interior surface of the cylindrical wall, thereby defining a plurality of hydraulic chambers within the hydraulic cylinder. This plurality of hydraulic chambers includes a pair of spool-positioning chambers at ends of the bilaterally moveable spool. Each of the pair of spool-positioning chambers is in fluid communication with a corresponding one of the pair of spool-controller ports. The plurality of hydraulic chambers is configured to provide fluid communication between each of the pair of hydraulic-actuator ports and a corresponding one of the pair of actuator-controller ports in response to the bilaterally moveable spool being moved to the first position. The plurality of hydraulic chambers is further configured to provide fluid communication between each of the pair of hydraulic-actuator ports and a corresponding one of the pair of spool-controller ports in response to the bilaterally moveable spool being moved to the second position.

DETAILED DESCRIPTION

Apparatus and associated methods relate to a transfer valve with dual authority control porting. The transfer valve has a hydraulic cylinder having a cylindrical wall extending between first and second ends. The cylindrical wall has hydraulic ports therethrough for facilitating operation of the transfer valve. Within the hydraulic cylinder, a bilaterally moveable spool is axially moveable between first and second positions. The bilaterally moveable spool defines hydraulic chambers within the hydraulic cylinder. In the first position, the hydraulic chambers and the hydraulic ports form a fluidly conductive path between a first source and a first application, and another between a second source and a second application. In the second position, the cavities and the hydraulic ports form a fluidly conductive path between the first source and the second application, and another between spool positioning cavities of the transfer valve and the first application.

Figure 1:
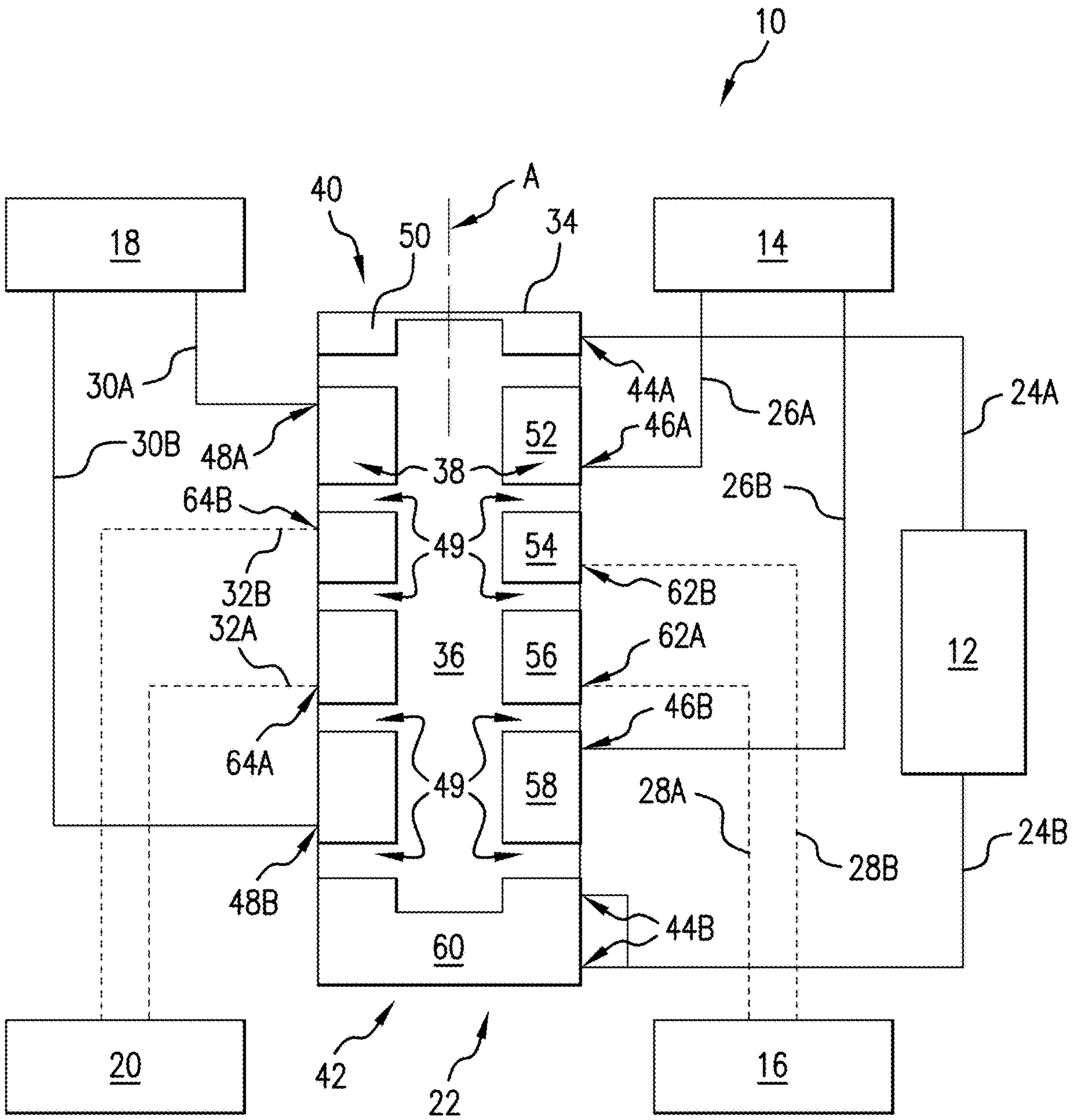
FIG. 1 is a schematic diagram depicting normal operation of a hydraulic system utilizing a transfer valve with dual authority control porting.

FIG. 1 is a schematic diagram depicting normal operation of a hydraulic system utilizing a transfer valve with dual authority control porting. In FIG. 1, hydraulic system 10 includes transfer-valve controller 12, first and second actuator controllers 14 and 16, first and second hydraulic actuators 18 and 20, and hydraulic transfer valve 22. Hydraulic transfer valve 22 is kind of a hub of hydraulic system 10, as hydraulic transfer valve 22 is hydraulically coupled to (i.e., in fluid communication with) each of transfer-valve controller 12, first and second actuator controllers 14 and 16, and first and second hydraulic actuators 18 and 20. Transfer-valve controller 12 is hydraulically coupled to hydraulic transfer valve 22 via hydraulic lines 24A and 24B. First actuator controller 14 is hydraulically coupled to transfer valve 22 via hydraulic lines 26A and 26B, and second actuator controller 16 is hydraulically coupled to transfer valve 22 via hydraulic lines 28A and 28B. First hydraulic actuator 18 is hydraulically coupled to transfer valve 22 via hydraulic lines 30A and 30B, and second hydraulic actuator 20 is hydraulically coupled to transfer valve 22 via hydraulic lines 32A and 32B.

Figure 2:
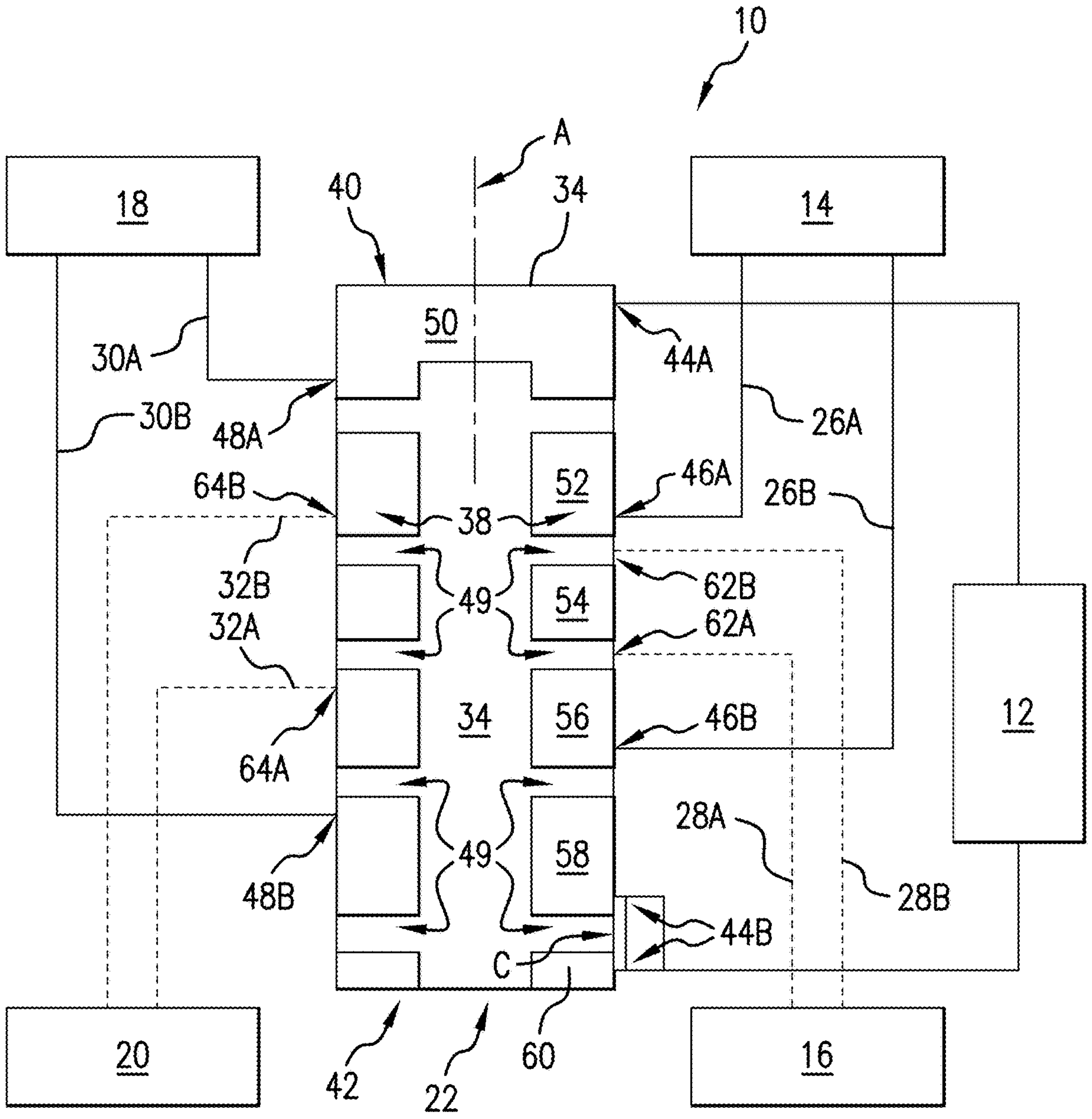
FIG. 2 is a schematic diagram depicting backup operation of a hydraulic system utilizing a transfer valve with dual authority control porting.

Hydraulic transfer valve 22, under operational control of transfer-valve controller 12, is designed to selectively configure hydraulic system 10 for two modes of operation. In a first mode (i.e., a normal mode) of operation, transfer-valve controller 12 causes transfer valve 22 to be configured such that first actuator controller 14 is in fluid communication with first hydraulic actuator 18 and second actuator controller 16 is in fluid communication with second hydraulic actuator 20. Such is the configuration depicted in FIG. 1. Hydraulic transfer valve 22 includes hydraulic cylinder 34 and bilaterally moveable spool 36. Together, hydraulic cylinder 34 and bilaterally moveable spool 36 create various hydraulic paths within hydraulic system 10. Transfer-valve controller 12 is configured to cause bilaterally moveable spool 36 to be axially positioned either in a first position as is depicted in FIG. 1 or in a second position as is depicted in FIG. 2. FIG. 2 is a schematic diagram depicting backup operation of a hydraulic system utilizing a transfer valve with dual authority control porting. In the depicted embodiment, as depicted in each of FIGS. 1 and 2, first hydraulic actuator 18 controls operation of a kinematic device that can safely be moved to a fail-safe position, but operation of the kinematic device manipulated by second hydraulic actuator 20 is maintained, even in the event of a malfunction of second actuator controller 16 or some other failure mode that results in loss of hydraulic control of second hydraulic actuator 20.

For such a malfunction of second actuator controller 16, hydraulic transfer valve 22 is configured to maintain operation of second hydraulic actuator 20, while simultaneously positioning first hydraulic actuator 18 in its fail-safe position. First, with reference to FIGS. 1 and 2, control of first hydraulic actuator 18 will be described for both normal operation and in the event of a failure of second actuator controller 16 (i.e., a backup mode of operation). Thereafter, control of second hydraulic actuator 20 will be described for both normal operation and in the event of a failure of second actuator controller 16.

Hydraulic cylinder 34 has cylindrical wall 38 extending between first and second ends 40 and 42. Cylindrical wall 38 includes pairs of hydraulic ports therethrough, including a pair of spool-controller ports 44A and 44B, a first pair of actuator-controller ports 46A and 46B, and a first pair of hydraulic-actuator ports 48A and 48B. These hydraulic ports 44A and 44B, 46A and 46B, and 48A and 48B provide fluid communication between hydraulic transfer valve 22 and transfer-valve controller 12, first actuator controller 14, and first hydraulic actuator 18, respectively. Bilaterally moveable spool 36 is axially moveable (i.e., moveable in a direction of axis A, which is common to both cylindrical wall 38 and bilaterally moveable spool) between the first and second positions within hydraulic cylinder 34. FIG. 1 discloses the normal mode of operation of hydraulic system 10, in which there is no malfunction of second actuator controller 16. As such, bilaterally moveable spool 36 is depicted in the first position in FIG. 1 and in the second position in FIG. 2.

Bilaterally moveable spool 36 has a plurality of sealing lands 49 configured to provide hydraulic seals with an interior surface of cylindrical wall 38, thereby defining a plurality of hydraulic chambers 50, 52, 54, 56, 58, and 60 within hydraulic cylinder 34. A pair of spool-positioning chambers 50 and 60 are located at ends of bilaterally moveable spool 36. Each of the pair of spool-positioning chambers 50 and 60 is in fluid communication with a corresponding one of the pair of spool-controller ports 44A and 44B, respectively. Transfer-valve controller 12 is in fluid communication with spool-controller ports 44A and 44B via hydraulic lines 24A and 24B, respectively. Because spool-positioning chambers 50 and 60 are in fluid communication with spool-controller ports 44A and 44B, transfer-valve controller 12 is in fluid communication with spool-positioning chambers 50 and 60. Control of the pressures within spool-positioning chambers 50 and 60 is used to move bilaterally moveable spool 36 to each of its first and second positions within hydraulic cylinder 34. As bilaterally moveable spool 36 is axially translated within hydraulic cylinder 34, hydraulic chambers 50, 52, 54, 56, 58, and 60 move relative to hydraulic ports 44A and 44B, 46A and 46B, and 48A and 48B. Such relative movement of hydraulic chambers 50, 52, 54, 56, 58, and 60 with respect to hydraulic ports 44A and 44B, 46A and 46B, and 48A and 48B causes various hydraulic connections to be made and/or broken.

Transfer-valve controller 12 causes such axially positioning of bilaterally moveable spool 36 by controlling a pressure differential between hydraulic fluid within the pair of spool-positioning chambers 50 and 60. Bilaterally moveable spool 36 is positioned in the first position (as depicted in FIG. 1) in response to the pressure of hydraulic fluid within spool-positioning chamber 60 exceeding the pressure of hydraulic fluid within spool-positioning chamber 50 by a threshold pressure difference. Conversely, bilaterally moveable spool 36 is positioned in the second position (as depicted in FIG. 2) in response to the pressure of hydraulic fluid within spool-positioning chamber 50 exceeding the pressure of hydraulic fluid within spool-positioning chamber 50 by a threshold pressure difference.

In the first position, as depicted in FIG. 1, hydraulic chambers 52 and 58 provide fluid communication between the first pair of actuator-controller ports 46A and 46B and the first pair of hydraulic-actuator ports 48A and 48B, respectively. This configuration provides fluid communication between first actuator controller 14 and first hydraulic actuator 18, thereby placing first hydraulic actuator 18 under the control of first actuator controller 14.

In the second position, as depicted in FIG. 2, hydraulic chambers 50 and 58 provide fluid communication between the spool-controller ports 44A and 44B and the first pair of hydraulic-actuator ports 48A and 48B, respectively. Although spool-controller port 44B provides fluid communication with hydraulic chamber 60, it is configured to also provide fluid communication with hydraulic chamber 58 in response to bilaterally moveable spool 36 being moved to the second position. To accomplish this, spool-controller port 44B can be elongated and/or can be a double port that is/are in fluid communication with both spool-positioning chamber 60 and hydraulic chamber 58 in response to bilaterally moveable spool 36 being moved to the second position. In other embodiments, a channel, which spans a corresponding one of the plurality of sealing lands 49 when in the second position, can be created in the interior surface of cylindrical wall 38, thereby fluidly connecting hydraulic chambers 58 and 60 when in the second position. For example, in FIG. 2, channel C extends along the interior surface of cylindrical wall 38 and is in fluid communication with spool-controller port 44B. First hydraulic actuator 18 is hydraulically connected to hydraulic transfer valve 22 in such a manner that hydraulic actuator 18 is in a fail-safe position, when bilaterally moveable spool 36 is in its second position. In this manner, transfer valve controller moves bilaterally moveable spool 36 to its second position within hydraulic cylinder 34 and moves first hydraulic actuator 18 to its fail-safe position. Hydraulic transfer valve 22, thus obviates the need of a dedicated controller for providing fail-safe positioning of first hydraulic actuator 18.

During such operations of positioning bilaterally moveable spool 36, not only is fluid connectivity pertaining to first hydraulic actuator 18 being configured, but also being configured is the fluid connectivity pertaining to second hydraulic actuator 20. Cylindrical wall 38 also includes a second pair of actuator-controller ports 62A and 62B, and a second pair of hydraulic-actuator ports 64A and 64B. In the first position, as depicted in FIG. 1, hydraulic chambers 54 and 56 provide fluid communication between the second pair of actuator-controller ports 62A and 62B and the second pair of hydraulic-actuator ports 64A and 64B, respectively. This configuration provides fluid communication between second actuator controller 16 and second hydraulic actuator 20, thereby placing second hydraulic actuator 20 under the control of second actuator controller 16. Thus, both first and second hydraulic actuators 18 and 20 are placed under the control of first and second actuator controllers 14 and 16, respectively, in response to bilaterally moveable spool 36 positioned in the first position.

In the second position, as depicted in FIG. 2, two of the sealing lands block fluid communication between actuator-controller ports 62A and 62B and any of hydraulic chambers 50, 52, 54, 56, 58, and 60. Thus, second actuator controller 16 is deadheaded (i.e., has been provided no hydraulic connections to an operating hydraulic actuator). Such deadheading of second actuator controller 16 can be appropriate in response to a malfunction thereof, for example. In this second position, while second controller 16 is being deadheaded, hydraulic chambers 52 and 56 provide fluid communication between the first pair of actuator-controller ports 46A and 46B and the second pair of hydraulic-actuator ports 64A and 64B, respectively, thereby placing second hydraulic actuator 20 under the control of first actuator controller 14. Hydraulic transfer valve 22 thus provides for backup operational control of second hydraulic actuator 20. Such backup operational control is provided by using first actuator controller 14 as a backup controller for second hydraulic actuator 20. While in such a backup mode of operation, first hydraulic actuator 18 is placed in its fail-safe position.

Discussion of Possible Embodiments

The following are non-exclusive descriptions of possible embodiments of the present invention.

Some embodiments relate to a transfer valve with fail-safe positioning capability. The transfer valve includes a bilaterally moveable spool within a hydraulic cylinder. The transfer valve has a cylindrical wall extending between first and second ends. A plurality of hydraulic ports is formed through the cylindrical wall. This plurality of ports includes a pair of spool-controller ports, a pair of actuator-controller ports, and a pair of hydraulic-actuator ports. The bilaterally moveable spool is axially moveable between first and second positions within the hydraulic cylinder. The bilaterally moveable spool has a plurality of sealing lands configured to provide hydraulic seals with an interior surface of the cylindrical wall, thereby defining a plurality of hydraulic chambers within the hydraulic cylinder. This plurality of hydraulic chambers includes a pair of spool-positioning chambers at ends of the bilaterally moveable spool. Each of the pair of spool-positioning chambers is in fluid communication with a corresponding one of the pair of spool-controller ports. The plurality of hydraulic chambers is configured to provide fluid communication between each of the pair of hydraulic-actuator ports and a corresponding one of the pair of actuator-controller ports in response to the bilaterally moveable spool being moved to the first position. The plurality of hydraulic chambers is further configured to provide fluid communication between each of the pair of hydraulic-actuator ports and a corresponding one of the pair of spool-controller ports in response to the bilaterally moveable spool being moved to the second position.

The transfer valve of the preceding paragraph can optionally include, additionally and/or alternatively, any one or more of the following features, configurations and/or additional components:

A further embodiment of the foregoing transfer valve, wherein the plurality of hydraulic chambers can include a pair of actuator-switching chambers, each between corresponding axially adjacent pairs of the plurality of sealing lands.

A further embodiment of any of the foregoing transfer valves, wherein one of the pair of spool-controller ports can be elongated and/or can be a double port that is/are in fluid communication with the corresponding one of the pair of spool-positioning chambers in response to the bilaterally moveable spool being moved to the first position, and in fluid communication with both the corresponding one of the pair of spool-positioning chambers and a corresponding one of the pair of actuator-switching chambers, in response to the bilaterally moveable spool being moved to the second position, thereby facilitating both movement of the bilaterally moveable spool and positioning of the actuator that is in fluid communication with the hydraulic-actuator ports in a fail-safe position.

A further embodiment of any of the foregoing transfer valves, wherein the cylindrical wall can include a channel on an inside surface. The channel spans a sealing land positioned between one of the pair of spool-positioning chambers and an actuator-switching chamber adjacent thereto, thereby facilitating fluid communication therebetween.

A further embodiment of any of the foregoing transfer valves, wherein the pair of actuator-controller ports can be a first pair of actuator-controller ports and the pair of hydraulic-actuator ports can be a first pair of hydraulic-actuator ports. The plurality of hydraulic ports can further include a second pair of actuator-control ports and a second pair of hydraulic-actuator ports. The plurality of hydraulic chambers can be further configured to provide fluid communication between each of the second pair of hydraulic-actuator ports and a corresponding one of the second pair of actuator-controller ports in response to the bilaterally moveable spool being moved to the first position. The plurality of hydraulic chambers can be further configured to provide fluid communication between each of the second pair of hydraulic-actuator ports and a corresponding one of the first pair of actuator-controller ports in response to the bilaterally moveable spool being moved to the second position.

A further embodiment of any of the foregoing transfer valves, wherein the plurality of hydraulic chambers can include first, second, third, and fourth actuator-switching chambers.

A further embodiment of any of the foregoing transfer valves, wherein the first pair of actuator-controller ports can be axially positioned to be in fluid communication with the first and fourth actuator-switching chambers in response to the bilaterally moveable spool being moved to the first position and in fluid communication with the first and third actuator-switching chambers in response to the bilaterally moveable spool being moved to the second position.

A further embodiment of any of the foregoing transfer valves, wherein the second pair of actuator-controller ports can be axially positioned to be in fluid communication with the second and third actuator-switching chambers in response to the bilaterally moveable spool being moved to the first position and blocked from fluid communication with any of the plurality of hydraulic chambers by two of the plurality of sealing lands in response to the bilaterally moveable spool being moved to the second position.

A further embodiment of any of the foregoing transfer valves, wherein the first pair of hydraulic-actuator ports can be axially positioned to be in fluid communication with the second and third actuator-switching chambers in response to the bilaterally moveable spool being moved to the first position and in fluid communication with the one of the pair of spool-positioning chambers and the fourth actuator-switching chambers in response to the bilaterally moveable spool being moved to the second position.

A further embodiment of any of the foregoing transfer valves, wherein the second pair of hydraulic-actuator ports can be axially positioned to be in fluid communication with the second and third actuator-switching chambers in response to the bilaterally moveable spool being moved to the first position and in fluid communication with the first and third actuator-switching chambers in response to the bilaterally moveable spool being moved to the second position.

Some embodiments relate to a hydraulic system including a hydraulic actuator, an actuator controller, a transfer-valve controller, and a transfer-valve. The hydraulic actuator is configured to control position of a kinematic device. The actuator controller is configured to control position of the hydraulic actuator, thereby controlling the position of the kinematic device. The transfer valve has a cylindrical wall extending between first and second ends 40 and 42. The cylindrical wall has a plurality of hydraulic ports therethrough including a pair of spool-controller ports in hydraulic communication with the transfer-valve controller, a pair of actuator-controller ports in hydraulic communication with the actuator controller, and a pair of hydraulic-actuator ports in hydraulic communication with the hydraulic actuator. The bilaterally moveable spool is axially moveable between first and second positions within the hydraulic cylinder. The bilaterally moveable spool has a plurality of sealing lands configured to provide hydraulic seals with an interior surface of the cylindrical wall, thereby defining a plurality of hydraulic chambers within the hydraulic cylinder. This plurality of hydraulic chambers includes a pair of spool-positioning chambers at ends of the bilaterally moveable spool. Each of the pair of spool-positioning chambers is in fluid communication with a corresponding one of the pair of spool-controller ports. The plurality of hydraulic chambers is configured to provide fluid communication between each of the pair of hydraulic-actuator ports and a corresponding one of the pair of actuator-controller ports in response to the bilaterally moveable spool being moved to the first position. The plurality of hydraulic chambers is further configured to provide fluid communication between each of the pair of hydraulic-actuator ports and a corresponding one of the pair of spool-controller ports in response to the bilaterally moveable spool being moved to the second position.

The hydraulic system of the preceding paragraph can optionally include, additionally and/or alternatively, any one or more of the following features, configurations and/or additional components:

A further embodiment of the foregoing hydraulic system, wherein the plurality of hydraulic chambers can include a pair of actuator-switching chambers, each between corresponding axially adjacent pairs of the plurality of sealing lands.

A further embodiment of any of the foregoing hydraulic systems, wherein one of the pair of spool-controller ports can be elongated and/or is a double port that is/are in fluid communication with the corresponding one of the pair of spool-positioning chambers in response to the bilaterally moveable spool being moved to the first position, and in fluid communication with both the corresponding one of the pair of spool-positioning chambers and a corresponding one of the pair of actuator-switching chambers, in response to the bilaterally moveable spool being moved to the second position, thereby facilitating both movement of the bilaterally moveable spool and positioning of the actuator that is in fluid communication with the hydraulic-actuator ports in a fail-safe position.

A further embodiment of any of the foregoing hydraulic systems, wherein the cylindrical wall can include a channel on an inside surface, the channel spanning a sealing land positioned between one of the pair of spool-positioning chambers and an actuator-switching chamber adjacent thereto, thereby facilitating fluid communication therebetween.

A further embodiment of any of the foregoing hydraulic systems, wherein the pair of actuator-controller ports can be a first pair of actuator-controller ports and the pair of hydraulic-actuator ports is a first pair of hydraulic-actuator ports. The plurality of hydraulic ports can further include a second pair of actuator-control ports and a second pair of actuator-positioning ports. The plurality of hydraulic chambers can be further configured to provide fluid communication between each of the second pair of hydraulic-actuator ports and a corresponding one of the second pair of actuator-controller ports in response to the bilaterally moveable spool being moved to the first position. The plurality of hydraulic chambers can be further configured to provide fluid communication between each of the second pair of hydraulic-actuator ports and a corresponding one of the first pair of actuator-controller ports in response to the bilaterally moveable spool being moved to the second position.

A further embodiment of any of the foregoing hydraulic systems, wherein the plurality of hydraulic chambers can include first, second, third, and fourth actuator-switching chambers.

A further embodiment of any of the foregoing hydraulic systems, wherein the first pair of actuator-controller ports can be axially positioned to be in fluid communication with the first and fourth actuator-switching chambers in response to the bilaterally moveable spool being moved to the first position and in fluid communication with the first and third actuator-switching chambers in response to the bilaterally moveable spool being moved to the second position.

A further embodiment of any of the foregoing hydraulic systems, wherein the second pair of actuator-controller ports can be axially positioned to be in fluid communication with the second and third actuator-switching chambers in response to the bilaterally moveable spool being moved to the first position and blocked from fluid communication with any of the plurality of hydraulic chambers by two of the plurality of sealing lands in response to the bilaterally moveable spool being moved to the second position.

A further embodiment of any of the foregoing hydraulic systems, wherein the first pair of hydraulic-actuator ports can be axially positioned to be in fluid communication with the second and third actuator-switching chambers in response to the bilaterally moveable spool being moved to the first position and in fluid communication with the one of the pair of spool-positioning chambers and the fourth actuator-switching chambers in response to the bilaterally moveable spool being moved to the second position.

A further embodiment of any of the foregoing hydraulic systems, wherein the second pair of hydraulic-actuator ports can be axially positioned to be in fluid communication with the second and third actuator-switching chambers in response to the bilaterally moveable spool being moved to the first position and in fluid communication with the first and third actuator-switching chambers in response to the bilaterally moveable spool being moved to the second position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hydraulic transfer valve with fail-safe positioning capability, the transfer valve comprising:

a hydraulic cylinder having a cylindrical wall extending between first and second ends; the cylindrical wall having a plurality of hydraulic ports therethrough including a pair of spool-controller ports, a pair of actuator-controller ports, and a pair of hydraulic-actuator ports; and a bilaterally moveable spool axially moveable between first and second positions within the hydraulic cylinder, the bilaterally moveable spool having a plurality of sealing lands, integrally formed, which are configured to provide hydraulic seals with an interior surface of the cylindrical wall, thereby defining a plurality of hydraulic chambers within the hydraulic cylinder including a pair of spool-positioning chambers at ends of the bilaterally moveable spool, each of the pair of spool-positioning chambers in fluid communication with a corresponding one of the pair of spool-controller ports, wherein:

the plurality of hydraulic chambers is configured to provide fluid communication between each of the pair of hydraulic-actuator ports and a corresponding one of the pair of actuator-controller ports in response to the bilaterally moveable spool being moved to the first position, the plurality of sealing lands configured to isolate each of the pair of hydraulic-actuator ports from a corresponding one of the pair of spool-controller ports in response to the bilaterally moveable spool being moved to the first position, and the plurality of hydraulic chambers is further configured to provide fluid communication between each of the pair of hydraulic-actuator ports and the corresponding one of the pair of spool-controller ports in response to the bilaterally moveable spool being moved to the second position.

2. The transfer valve of claim 1, wherein the plurality of hydraulic chambers includes a pair of actuator-switching chambers, each between corresponding axially adjacent pairs of the plurality of sealing lands.

3. The transfer valve of claim 2, wherein one of the pair of spool-controller ports is elongated and/or is a double port that is/are in fluid communication with the corresponding one of the pair of spool-positioning chambers in response to the bilaterally moveable spool being moved to the first position, and in fluid communication with both the corresponding one of the pair of spool-positioning chambers and a corresponding one of the pair of actuator-switching chambers, in response to the bilaterally moveable spool being moved to the second position, thereby facilitating both movement of the bilaterally moveable spool and positioning of the actuator that is in fluid communication with the hydraulic-actuator ports in a fail-safe position.

4. The transfer valve of claim 2, wherein the cylindrical wall includes a channel on an inside surface, the channel spanning a sealing land positioned between one of the pair of spool-positioning chambers and an actuator-switching chamber adjacent thereto, thereby facilitating fluid communication therebetween.

5. The transfer valve of claim 1, wherein the pair of actuator-controller ports is a first pair of actuator-controller ports and the pair of hydraulic-actuator ports is a first pair of hydraulic-actuator ports, the plurality of hydraulic ports further includes:

a second pair of actuator-control ports; and a second pair of hydraulic-actuator ports, wherein:

the plurality of hydraulic chambers is further configured to provide fluid communication between each of the second pair of hydraulic-actuator ports and a corresponding one of the second pair of actuator-controller ports in response to the bilaterally moveable spool being moved to the first position, the plurality of sealing lands is configured to isolate each of the pair of hydraulic-actuator ports from a corresponding one of the pair of spool-controller ports in response to the bilaterally moveable spool being moved to the first position, and the plurality of hydraulic chambers is further configured to provide fluid communication between each of the second pair of hydraulic-actuator ports and the corresponding one of the first pair of actuator-controller ports in response to the bilaterally moveable spool being moved to the second position.

6. The hydraulic transfer valve of claim 5, wherein the plurality of hydraulic chambers includes first, second, third, and fourth actuator-switching chambers.

7. The hydraulic transfer valve of claim 6, wherein the first pair of actuator-controller ports is axially positioned to be in fluid communication with the first and fourth actuator-switching chambers in response to the bilaterally moveable spool being moved to the first position and in fluid communication with the first and third actuator-switching chambers in response to the bilaterally moveable spool being moved to the second position.

8. The hydraulic transfer valve of claim 7, wherein the second pair of actuator-controller ports is axially positioned to be in fluid communication with the second and third actuator-switching chambers in response to the bilaterally moveable spool being moved to the first position and blocked from fluid communication with any of the plurality of hydraulic chambers by two of the plurality of sealing lands in response to the bilaterally moveable spool being moved to the second position.

9. The hydraulic transfer valve of claim 8, wherein the first pair of hydraulic-actuator ports is axially positioned to be in fluid communication with the second and third actuator-switching chambers in response to the bilaterally moveable spool being moved to the first position and in fluid communication with the one of the pair of spool-positioning chambers and the fourth actuator-switching chambers in response to the bilaterally moveable spool being moved to the second position.

10. The hydraulic transfer valve of claim 9, wherein the second pair of hydraulic-actuator ports is axially positioned to be in fluid communication with the second and third actuator-switching chambers in response to the bilaterally moveable spool being moved to the first position and in fluid communication with the first and third actuator-switching chambers in response to the bilaterally moveable spool being moved to the second position.

11. A hydraulic system comprising:
- a hydraulic actuator configured to control position of a kinematic device;
- an actuator controller configured to control position of the hydraulic actuator, thereby controlling the position of the kinematic device;
- a transfer-valve controller; and
- a transfer valve including:
  - a hydraulic cylinder having a cylindrical wall extending between first and second ends; the cylindrical wall having a plurality of hydraulic ports therethrough including a pair of spool-controller ports in hydraulic communication with the transfer-valve controller, a pair of actuator-controller ports in hydraulic communication with the actuator controller, and a pair of hydraulic-actuator ports in hydraulic communication with the hydraulic actuator; and
  - a bilaterally moveable spool axially moveable between first and second positions within the hydraulic cylinder, the bilaterally moveable spool having a plurality of sealing lands configured to provide hydraulic seals with an interior surface of the cylindrical wall, thereby defining a plurality of hydraulic chambers within the hydraulic cylinder including a pair of spool-positioning chambers at ends of the bilaterally moveable spool, each of the pair of spool-positioning chambers in fluid communication with a corresponding one of the pair of spool-controller ports, wherein:
  - the plurality of hydraulic chambers is configured to provide fluid communication between each of the pair of hydraulic-actuator ports and a corresponding one of the pair of actuator-controller ports in response to the bilaterally moveable spool being moved to the first position;
  - the plurality of sealing lands is configured to isolate each of the pair of hydraulic-actuator ports from a corresponding one of the pair of spool-controller ports in response to the bilaterally moveable spool being moved to the first position, and
  - the plurality of hydraulic chambers is further configured to provide fluid communication between each of the pair of hydraulic-actuator ports and a corresponding one of the pair of spool-controller ports in response to the bilaterally moveable spool being moved to the second position.

12. The hydraulic system of claim 11, wherein the plurality of hydraulic chambers includes a pair of actuator-switching chambers, each between corresponding axially adjacent pairs of the plurality of sealing lands.

13. The hydraulic system of claim 12, wherein one of the pair of spool-controller ports is elongated and/or is a double port that is/are in fluid communication with the corresponding one of the pair of spool-positioning chambers in response to the bilaterally moveable spool being moved to the first position, and in fluid communication with both the corresponding one of the pair of spool-positioning chambers and a corresponding one of the pair of actuator-switching chambers, in response to the bilaterally moveable spool being moved to the second position, thereby facilitating both movement of the bilaterally moveable spool and positioning of the actuator that is in fluid communication with the hydraulic-actuator ports in a fail-safe position.

14. The hydraulic system of claim 12, wherein the cylindrical wall includes a channel on an inside surface, the channel spanning a sealing land positioned between one of the pair of spool-positioning chambers and an actuator-switching chamber adjacent thereto, thereby facilitating fluid communication therebetween.

15. The hydraulic system of claim 11, wherein the pair of actuator-controller ports is a first pair of actuator-controller ports and the pair of hydraulic-actuator ports is a first pair of hydraulic-actuator ports, the plurality of hydraulic ports further includes:
- a second pair of actuator-control ports; and
- a second pair of actuator-positioning ports, wherein:
- the plurality of hydraulic chambers is further configured to provide fluid communication between each of the second pair of hydraulic-actuator ports and a corresponding one of the second pair of actuator-controller ports in response to the bilaterally moveable spool being moved to the first position, and
- the plurality of hydraulic chambers is further configured to provide fluid communication between each of the second pair of hydraulic-actuator ports and a corresponding one of the first pair of actuator-controller ports in response to the bilaterally moveable spool being moved to the second position.

16. The hydraulic system of claim 15, wherein the plurality of hydraulic chambers includes first, second, third, and fourth actuator-switching chambers.

17. The hydraulic system of claim 16, wherein the first pair of actuator-controller ports is axially positioned to be in fluid communication with the first and fourth actuator-switching chambers in response to the bilaterally moveable spool being moved to the first position and in fluid communication with the first and third actuator-switching chambers in response to the bilaterally moveable spool being moved to the second position.

18. The hydraulic system of claim 17, wherein the second pair of actuator-controller ports is axially positioned to be in fluid communication with the second and third actuator-switching chambers in response to the bilaterally moveable spool being moved to the first position and blocked from fluid communication with any of the plurality of hydraulic chambers by two of the plurality of sealing lands in response to the bilaterally moveable spool being moved to the second position.

19. The hydraulic system of claim 18, wherein the first pair of hydraulic-actuator ports is axially positioned to be in fluid communication with the second and third actuator-switching chambers in response to the bilaterally moveable spool being moved to the first position and in fluid communication with the one of the pair of spool-positioning chambers and the fourth actuator-switching chambers in response to the bilaterally moveable spool being moved to the second position.

20. The hydraulic system of claim 19, wherein the second pair of hydraulic-actuator ports is axially positioned to be in fluid communication with the second and third actuator-switching chambers in response to the bilaterally moveable spool being moved to the first position and in fluid communication with the first and third actuator-switching chambers in response to the bilaterally moveable spool being moved to the second position.

* * * * *